United States Patent [19]
Gilhousen et al.

[11] Patent Number: 5,101,501
[45] Date of Patent: Mar. 31, 1992

[54] METHOD AND SYSTEM FOR PROVIDING A SOFT HANDOFF IN COMMUNICATIONS IN A CDMA CELLULAR TELEPHONE SYSTEM

[75] Inventors: Klein S. Gilhousen; Roberto Padovani, both of San Diego; Charles E. Wheatley, III, Del Mar, all of Calif.

[73] Assignee: Qualcomm Incorporated, San Diego, Calif.

[21] Appl. No.: 433,030

[22] Filed: Nov. 7, 1989

[51] Int. Cl.⁵ .................. H04Q 7/00; H04M 11/00
[52] U.S. Cl. ........................... 455/33; 455/34; 455/56; 379/60; 375/1
[58] Field of Search .............. 455/17, 32–34, 455/54, 56, 67; 379/59, 60, 63; 375/1

[56] References Cited

U.S. PATENT DOCUMENTS

| | | | |
|---|---|---|---|
| 3,819,872 | 6/1974 | Hamrick | 379/60 |
| 4,112,257 | 9/1978 | Frost | 455/33 |
| 4,222,115 | 9/1980 | Cooper et al. | 455/33 |
| 4,398,063 | 8/1983 | Hass et al. | 455/33 |
| 4,608,711 | 8/1986 | Goldman | 455/33 |
| 4,765,753 | 8/1988 | Schmidt | 455/33 |

Primary Examiner—Curtis Kuntz
Assistant Examiner—Andrew Faile
Attorney, Agent, or Firm—Russell B. Miller

[57] ABSTRACT

In a cellular telephone system a system for directing communications between a mobile user and cell-sites as a mobile user changes cell-site service areas. The mobile user includes an apparatus for, while in communication with another system user via one cell-site, determining a transition of the mobile user from the cell-site service area to the service area of another cell-site. The system includes circuitry responsive to the indication for coupling communications between the mobile user and the other system user via the new cell-site while the mobile user also remains in communication with the system user via the first cell-site. The system further includes apparatus responsive to the coupling of the communications between the mobile user and the other system user via the new cell-site for terminating the communications between the mobile user and another system user via cell-site with communications continuing between the mobile user and the system user via the new cell-site.

23 Claims, 4 Drawing Sheets

METHOD AND SYSTEM FOR PROVIDING A SOFT HANDOFF IN COMMUNICATIONS IN A CDMA CELLULAR TELEPHONE SYSTEM

BACKGROUND OF THE INVENTION

I. Field of the Invention

The present invention relates to cellular telephone systems. More specifically, the present invention relates to a novel and improved system for controlling handoff in communications of cell-site stations with a mobile unit in a code division multiple access (CDMA) cellular telephone system.

II. Description of the Related Art

The use of code division multiple access (CDMA) modulation techniques is but one of several techniques for facilitating communications in which a large number of system users are present. Although other techniques such as time division multiple access (TDMA), frequency division multiple access (FDMA) and AM modulation schemes such as amplitude companded single sideband (ACSSB) are known, CDMA has significant advantages over these other modulation techniques. The use of CDMA techniques in a multiple access communication system is disclosed in U.S. patent application Ser. No. 06/921,261, filed Oct. 17, 1986, entitled "SPREAD SPECTRUM MULTIPLE ACCESS COMMUNICATION SYSTEM USING SATELLITE OR TERRESTRIAL REPEATERS", now U.S. Pat. No. 4,901,307 assigned to the Assignee of the present invention, the disclosure thereof incorporated by reference.

In the just mentioned patent, a multiple access technique is disclosed where a large number of mobile telephone system users, each having a transceiver, communicate through satellite repeaters or terrestrial base stations (also known as cell-site stations, or for short, cell-sites) using code division multiple access (CDMA) spread spectrum communication signals. In using CDMA communications, the frequency spectrum can be reused multiple times thus permitting an increase in system user capacity. The use of CDMA techniques results in a much higher spectral efficiency than can be achieved using other multiple access techniques.

In the conventional cellular telephone systems the available frequency band is divided into channels typically 30 KHz in bandwidth while analog FM modulation techniques are used. The system service area is divided geographically into cells of varying size. The available frequency channels are divided into sets with each set usually containing an equal number of channels. The frequency sets are assigned to cells in such a way as to minimize the possibility of co-channel interference. For example, consider a system in which there are seven frequency sets and the cells are equal size hexagons. A frequency set used in one cell will not be used in the six nearest or surrounding neighbors of that cell. Furthermore, the frequency set in one cell will not be used in the twelve next nearest neighbors of that cell.

In the conventional cellular telephone system, the handoff scheme implemented is intended to allow a call to continue when a mobile telephone crosses the boundary between two cells. The handoff from one cell to another is initiated when the cell-site receiver handling the call notices that the received signal strength from the mobile telephone falls below a predetermined threshold value. A low signal strength indication implies that the mobile telephone must be near the cell border. When the signal level falls below the predetermined threshold value, the cell-site asks system controller to determine whether a neighboring cell-site receives the mobile telephone signal with better signal strength than the current cell-site.

The system controller in response to the current cell-site inquiry sends messages to the neighboring cell-sites with a handoff request. The cell-site neighboring the current cell-site employs special scanning receivers which look for the signal from the mobile unit on the specified channel. Should one of the neighboring cell-sites report an adequate signal level to the system controller, then a handoff will be attempted.

Handoff is then initiated when an idle channel from the channel set used in the new cell-site is selected. A control message is sent to the mobile telephone commanding it to switch from the current channel to the new channel. At the same time, the system controller switches the call from the first cell-site to the second cell-site.

In the conventional system a call will be discontinued if the handoff to the new cell-site is unsuccessful. There are many reasons that a failure in handoff may occur. Handoff can fail if there is no idle channel available in the neighboring cell for communicating the call. Handoff can also fail if another cell-site reports hearing the mobile telephone in question, when in fact this cell-site actually hears a different mobile unit using the same channel in a completely different cell. This reporting error will result in the call being switched to a wrong cell, typically one in which signal strength is insufficient to maintain communications. Furthermore should the mobile telephone fail to hear the command to switch channels, the handoff will fail. Actual operating experience indicates that handoff failures occur frequently which questions the reliability of the system.

Another common problem in the conventional telephone system occurs when the mobile telephone is near the border between two cells. In this situation the signal level tends to fluctuate at both cell-sites. This signal level fluctuation results in a ping-ponging situation in which repeated requests are made to hand the call back and forth between the two cell-sites. Such additional unnecessary handoff requests increase the possibility of the mobile unit incorrectly hearing the channel switch command or fail in hearing the command at all. Furthermore, the ping-ponging situation raises the possibility that the call will be discontinued if it is unnecessarily transferred to a cell in which all channels are currently in use and thus unavailable for accepting the handoff.

It is therefore an object of the present invention to provide in a cellular telephone system improvements in call handoff between cell-sites and thus provide greater service reliability.

SUMMARY OF THE INVENTION

In a CDMA cellular telephone system, the same frequency band is used for all cells. The CDMA waveform properties that provide processing gain are also used to discriminate between signals that occupy the same frequency band. A mobile telephone or unit thus need not switch frequencies when handoff of the call is made from one cell-site to another. Furthermore, the probability that the call will be discontinued if the handoff command is received in error is substantially reduced.

In a CDMA cellular telephone system, each cell-site has a plurality of modulator-demodulator units or spread spectrum modems. Each modem consists of a digital spread spectrum transmit modulator, at least one digital spread spectrum data receiver and a searcher receiver. Each modem at the cell-site is assigned to a mobile unit as needed to facilitate communications with the assigned mobile unit. Therefore in many instances many modems are available for use while other ones may be active in communicating with respective mobile units. In the present invention a handoff scheme is employed for a CDMA cellular telephone system in which a new cell-site modem is assigned to a mobile unit while the old cell-site continues to service the call. When the mobile unit is located in the transition region between the two cell-sites, the call can be switched back and forth between cell-sites as signal strength dictates. Since the mobile unit is always communicating through at least one cell-site, no disrupting effects to the mobile unit or in service will occur.

When mobile unit communications are firmly established with the new cell-site, e.g. the mobile unit is well within the new cell, the old cell-site discontinues servicing the call. The just described handoff techniques can be considered as a "soft" handoff in communications between cell-sites with the mobile unit. The soft handoff is in essence a make-before-break switching function. In contrast, conventional cellular telephone systems can be considered as providing a break-before-make switching function.

In a CDMA cellular telephone system of the present invention, a soft handoff technique is implemented which also permits the mobile unit to initiate a handoff. The mobile unit is also permitted to determine the best new cell-site to which communications are to be transferred to from an old cell-site. Although it is preferred that the mobile unit initiate the handoff request and determine the new cell-site, handoff process decisions may be made as in the conventional cellular telephone system. As discussed previously with respect to conventional systems, the cell-site determines when a handoff may be appropriate and, via the system controller, request neighboring cells to search for the mobile unit signal. The cell-site receiving the strongest signal as determined by the system controller then accepts the handoff.

In the CDMA cellular telephone system, each cell-site transmits a "pilot carrier" signal. This pilot signal is used by the mobile units to obtain initial system synchronization and to provide robust time, frequency and phase tracking of the cell-site transmitted signals.

Each cell-site also transmits a "setup" channel comprised of spread spectrum modulated information, such as cell-site identification, system timing, mobile paging information and various other control signals. The pilot signal transmitted by each cell-site is of the same spreading code but with a different code phase offset. Phase offset allows the pilot signals to be distinguished from one another resulting in distinguishment between cell-sites from which they originate. Use of the same pilot signal code allows the mobile unit to find system timing synchronization by a single search through all pilot signal code phases. The strongest pilot signal, as determined by a correlation process for each code phase, is readily identifiable. The identified pilot signal corresponds to the pilot signal transmitted by the nearest cell-site.

Upon acquisition of the strongest pilot signal, i.e. initial synchronization of the mobile unit with the strongest pilot signal, the mobile unit searches for the appropriate setup channel of that cell-site. The setup channel is transmitted by the cell-site using one of a plurality of different predetermined spread spectrum codes. In an exemplary embodiment of the present invention, twenty-one different codes are used. However, it should be understood that more or less codes could be used in the setup channel as determined by system parameters. The mobile unit then begins a search through all of the different codes used in the setup channel.

When the mobile unit identifies the appropriate setup code for that cell-site, system information is received and processed. The mobile unit further monitors the setup channel for control messages. One such control message would indicate a call is waiting for transfer to this mobile unit.

The mobile unit continues to scan the received pilot carrier signal code at the code offsets corresponding to neighboring cell-site transmitted pilot signals. This scanning is done in order to determine if the pilot signal emanating from neighboring cells is becoming stronger than the pilot signal first determined to be strongest. If, while in this call inactive mode, a neighbor cell-site pilot signal becomes stronger than that of the initial cell-site transmitted pilot signal, the mobile unit will acquire the stronger pilot signal and corresponding setup channel of the new cell-site.

When a call is initiated, a pseudonoise (PN) code address is determined for use during the course of this call. The code address may be either assigned by the cell-site or be determined by prearrangement based upon the identity of the mobile unit. After a call is initiated the mobile unit continues to scan the pilot signal transmitted by cell-sites located in neighboring cells. Pilot signal scanning continues in order to determine if one of the neighboring cell-site transmitted pilot signals becomes stronger than the pilot signal transmitted by the cell-site the mobile unit is in communication with. When the pilot signal transmitted by a cell-site located in a neighboring cell becomes stronger than the pilot signal transmitted by a cell-site in the current cell, it is an indication to the mobile unit that a new cell has been entered and that a handoff should be initiated. In response to this pilot signal strength determination, the mobile unit generates and transmits a control message to the cell-site presently servicing the call. This control message, indicative that a new cell-site transmitted pilot signal is now stronger than the current cell-site transmitted pilot signal, is provided to the system controller. The control message further contains information identifying the new cell-site and PN code. The control message as relayed to the system controller is interpreted that a handoff in mobile unit communications to the identified new cell-site is to begin.

The system controller now begins the handoff process. It should be understood that during handoff the PN code address of the particular mobile unit which is to undergo the handoff process need not change. The system controller begins the handoff by assisting in the assignment of a modem located in the new cell-site to the call. This modem is given the PN address associated with the call in communications between the mobile unit and the current cell-site modem. The new cell-site modem assigned to service the call searches for and finds the mobile unit transmitted signal. The cell-site modem also begins transmitting an outbound signal to the mobile unit. The mobile unit searches for this outbound signal in accordance with the signal and setup channel information provided by the new cell-site.

When the new cell-site modem transmitted signal is acquired, the mobile unit switches over to listening to this signal. The mobile unit then transmits a control message indicating that handoff is complete. The control message is provided by either or both of the old and new cell-site modems to the system controller. In response to this control message the system controller switches the call over to the new cell-site modem alone while discontinuing the call through the old cell-site modem. The old cell-site modem then enters a pool of idle modems available for reassignment.

As an additional improvement, the handoff process can introduce a second mode of operation. This second mode is referred to herein as the cell-site diversity mode. The subject matter on the cell-site diversity mode is further disclosed in copending U.S. patent application entitled "DIVERSITY RECEIVER IN A CDMA CELLULAR TELEPHONE SYSTEM", Ser. No. 07/432,552, filed Nov. 7, 1989, by the inventors hereof and assigned to the Assignee of the present invention.

In the cell-site diversity mode the call is allowed to linger in the in-between state as described above with reference to the call being processed by two cell-sites. In the exemplary embodiment described herein with reference to the mobile telephone of the present invention, a total of three demodulator processors or receivers are utilized. One of the receivers is used for the scanning function, while the two other receivers are used as a two channel diversity receiver. During operation in a single cell, the scanning receiver attempts to find the cell-site transmitted signal travelling upon multiple paths to the mobile unit. These multipath signals are typically caused by reflections of the signals from terrain, buildings and other signals obstructions. When two or more such reflections are found, the two receivers are assigned to the two strongest paths. The scanning receiver continues to evaluate the multiple paths to keep the two receivers synchronized with signals on the two strongest paths as path conditions change.

In the cell-site diversity mode, the strongest two paths from each cell-site is determined by the search receiver. The two receivers are assigned to demodulate the signals on the strongest two paths of the four paths available from the original cell-site and from the new cell-site. The data demodulation process uses information from both of these receivers in a diversity combining operation. The result of this diversity combining operation is a greatly improved resistance to deleterious fading that may occur in the multi-paths cellular telephone environment.

Although different types of diversity combining techniques are known in the art, the present invention uses diversity combining to significantly advance the quality and reliability of communications in a mobile cellular telephone system. In the present invention a form of maximal ratio combining is utilized. The signal-to-noise ratio is determined for both paths being combined with the contributions from the two paths weighted accordingly. Combining is coherent since pilot signal demodulation allows the phase of each path to be determined.

In the path from the mobile unit to the two cell-sites, path diversity reception is also obtained by having both cell-sites demodulate the mobile unit transmitted signals. Both cell-sites forward their demodulated data signals to the system controller along with an indication of signal quality for each cell-site receiver. The system controller then combines the two versions of the mobile unit signal and selects the signal with the best quality indication. It should be understood that it is possible to transmit the undecoded or even the undemodulated signals to the system controller in order to allow a better diversity combining process to be utilized.

The handoff process in the cell diversity mode is initiated as previously discussed. The mobile unit determines that a neighboring cell-site transmitted signal is of a signal strength great enough to allow good quality demodulation of the signal. The mobile unit transmits a control message to the current cell-site indicating the identity of this new cell-site and a request for the cell diversity mode. The cell-site then relays the cell-site identity and request to the system controller.

The system controller responds by connecting the call to a modem in the new cell-site. The system controller then performs diversity combining of the signals received by the two cell-sites while the mobile unit performs diversity combining of the signals received from the two cell-sites. The cell diversity mode continues as long as signals received from both cell-sites are of a level sufficient to permit good quality demodulation.

The mobile unit continues to search for signals transmitted from other cell-sites. If a third cell-site transmitted signal becomes stronger than one of the original two cell-site signals, the control message is then transmitted by the mobile unit via at least one current cell-site to the system controller. The control message indicates the identity of this cell-site and a request for handoff. The system controller then discontinues the call being communicated via the weakest cell-site signal of the three while providing the call through the two strongest cell-sites. Should the mobile units be equipped with additional receivers, such as three receivers, a triple cell-site diversity mode may be implemented.

The cell-site diversity mode is terminated when the mobile unit determines that only one cell-site is providing adequate signals for quality demodulation. The mobile unit then sends a control message indicative of the cell-site to remain in communication upon termination of the cell-site diversity mode. The cell-site diversity mode may also be terminated by the system controller if the system were to become overloaded with an insufficient number of modems available to support all mobile unit requests for this mode of operation. The cell-site diversity mode as discussed is implemented by decision being made at the mobile unit to operate in the cell-site diversity mode. However, it should be understood that the cell-site diversity mode can be implemented with the decisions for operation in this mode being made at the system controller.

The present invention provides a substantial improvement over present cellular telephone systems with respect to mobile unit handoff. The make-before-break handoff mechanism of the present invention is a significant improvement in overall system reliability with lower service disruption. The implementation of a cell-site diversity mode provides further improvements over conventional cellular telephone systems by providing additional system reliability and quality in communications.

BRIEF DESCRIPTION OF THE DRAWINGS

The features and advantages of the present invention will become more apparent from the detailed description set forth below when taken in conjunction with the drawings in which like reference characters correspond throughout and wherein.

DETAILED DESCRIPTION OF THE PREFERRED EMBODIMENTS

Figure 1:
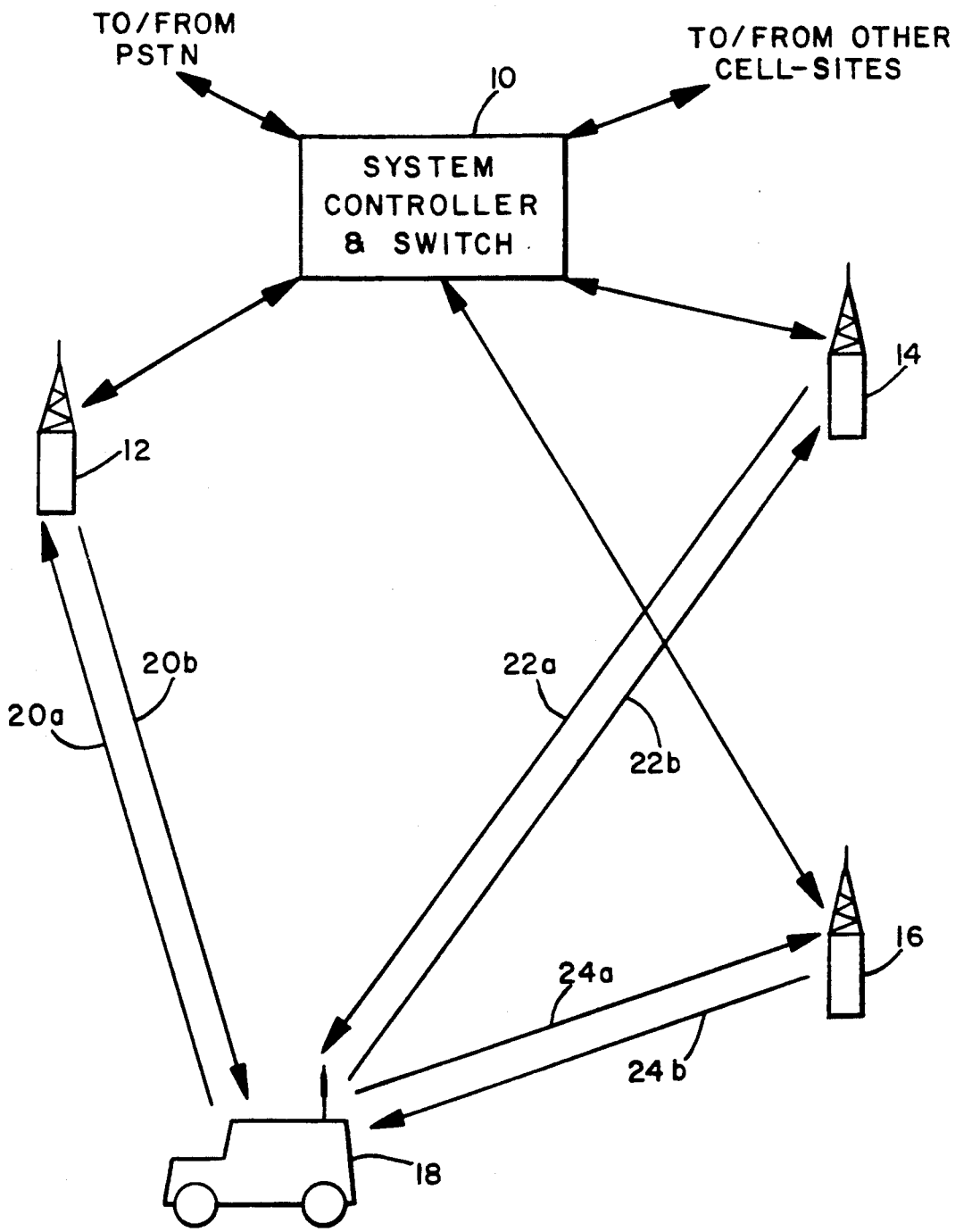
FIG. 1 is a schematic overview of an exemplary CDMA cellular telephone system in accordance with the present invention.

An exemplary telephone system in which the present invention is embodied is illustrated in FIG. 1. The system illustrated in FIG. 1 utilizes CDMA modulation techniques in communication between the system mobile units or mobile telephones, and the cell-sites. Cellular systems in large cities may have hundreds of cell-site stations serving hundreds of thousands of mobile telephones. The use of CDMA techniques readily facilitates increases in user capacity in systems of this size as compared to conventional FM modulation cellular systems.

In FIG. 1, system controller and switch 10, also referred to as mobile telephone switching office (MTSO), typically includes interface and processing circuitry for providing system control to the cell-sites. Controller 10 also controls the routing of telephone calls from the public switched telephone network (PSTN) to the appropriate cell-site for transmission to the appropriate mobile unit. Controller 10 also controls the routing of calls from the mobile units, via at least one cell-site to the PSTN. Controller 10 may direct calls between mobile users via the appropriate cell-site stations since such mobile units do not typically communicate directly with one another.

Controller 10 may be coupled to the cell-sites by various means such as dedicated telephone lines, optical fiber links or by microwave communication links. In FIG. 1, three such exemplary cell-sites, 12, 14 and 16 along with an exemplary mobile unit 18, which includes a cellular telephone, are illustrated. Arrows 20a-20b define the possible communication link between cell-site 12 and mobile unit 18. Arrows 22a-22b define the possible communication link between cell-site 14 and mobile unit 18. Similarly, arrows 24a-24b define the possible communication link between cell-site 16 and mobile unit 18.

The cell-site service areas or cells are designed in geographic shapes such that the mobile unit will normally be closest to one cell-site. When the mobile unit is idle, i.e. no calls in progress, the mobile unit constantly monitors the pilot signal transmissions from each nearby cell-site. As illustrated in FIG. 1 the pilot signals are respectively transmitted to mobile unit 18 by cell-sites 12, 14 and 16 respectively upon communication links 20b, 22b and 24b. The mobile unit then determines which cell it is in by comparing pilot signal strength transmitted from these particular cell-sites.

In the example illustrated in FIG. 1, mobile unit 18 may be considered closest to cell-site 16. When mobile unit 18 initiates a call, a control message is transmitted to the nearest cell-site, cell-site 16. Cell-site 16 upon receiving the call request message, signals system controller 10 and transfers the call number. System controller 10 then connects the call through the PSTN to the intended recipient.

Should a call be initiated within the PSTN, controller 10 transmits the call information to all the cell-sites in the area. The cell-sites in return transmit a paging message to the intended recipient mobile unit. When the mobile unit hears a page message, it responds with a control message that is transmitted to the nearest cell-site. This control message signals the system controller that this particular cell-site is in communication with the mobile unit. Controller 10 then routes the call through this cell-site to the mobile unit.

Should mobile unit 18 move out of the coverage area of the initial cell-site, cell-site 16, an attempt is made to continue the call by routing the call through another cell-site. In the handoff process there are two different methods of initiating the handoff of the call or routing through another cell-site.

The first method, called the cell-site initiated handoff, is similar to the handoff method employed in the original first generation analog cellular telephone systems currently in use. In the cell-site initiated handoff method, the initial cell-site, cell-site 16, notices that the signal transmitted by mobile unit 18 has fallen below a certain threshold level. Cell-site 16 then transmits a handoff request to system controller 10. Controller 10 relays the request to all neighboring cell-sites, 14, 12 of cell-site 16. The controller transmitted request includes information relating to the channel, including the PN code sequence used by mobile unit 18. Cell-sites 12 and 14 tune a receiver to the channel being used by the mobile unit and measure the signal strength, typically using digital techniques. If one of cell-sites 12 and 14 receivers report a stronger signal than the initial cell-site reported signal strength, then a handoff is made to this cell-site.

The second method of initiating a handoff is called the mobile initiated handoff. The mobile unit is equipped with a search receiver which is used to scan the pilot signal transmission of neighboring cell-sites 12 and 14, in addition to performing other functions. If a pilot signal of cell-sites 12 and 14 is found to be stronger than the pilot signal of cell-site 16, mobile unit 18 transmits a control message to the current cell-site, cell-site 16. This control message contains information identifying the cell-site of greater signal strength in addition to information requesting a handoff to this cell-site. Cell-site 16 transfers this control message to controller 10.

The mobile initiated handoff method has various advantages over the cell-site initiated handoff method. The mobile unit becomes aware of changes in paths between itself and the various neighboring cell-sites much sooner and with less effort than the cell-sites are capable of doing. However, to perform a mobile initiated handoff, each mobile unit must be provided with a searching receiver to perform the scanning function. However, in the exemplary embodiment described herein of a mobile unit CDMA communications capability, the search receiver has additional functions which require its presence.

Figure 2:
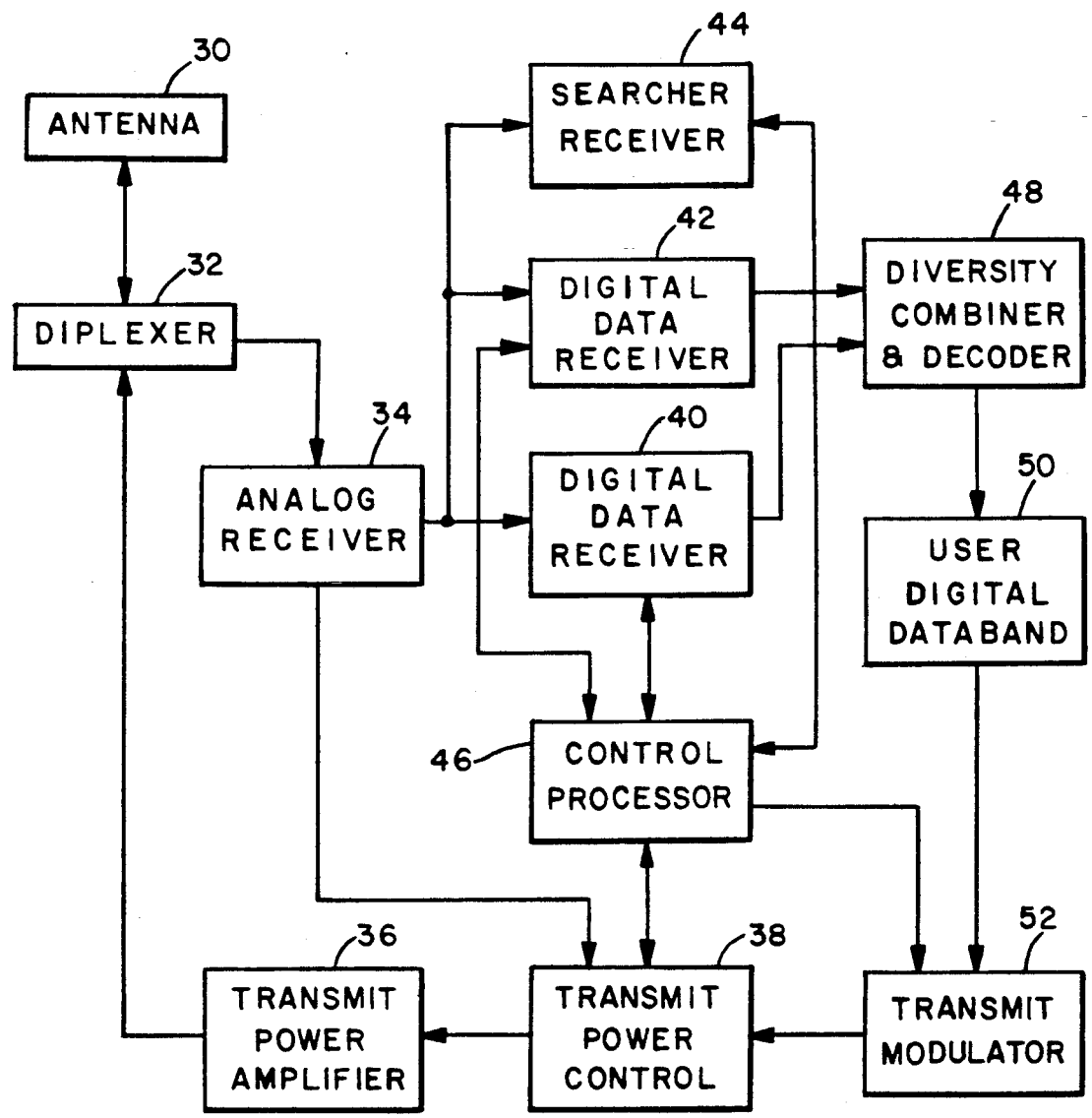
FIG. 2 is a block diagram of a mobile unit telephone configured for CDMA communications in a CDMA cellular telephone system.

FIG. 2 illustrates in block diagram form an exemplary mobile unit. The mobile unit includes an antenna 30 which is coupled through diplexer 32 to analog receiver 34 and transmit power amplifier 36. Antenna 30 and diplexer 32 are of standard design and permit simultaneous transmission and reception through a single antenna. Antenna 30 collects transmitted signals and provides them through diplexer 32 to analog receiver 34. Receiver 34 receives the RF frequency signals from diplexer 32 which are typically in the 850 MHz frequency band for amplification and frequency downconversion to an IF frequency. This frequency translation process is accomplished using a frequency synthesizer of standard design which permits the receiver to be tuned to any of the frequencies within the receive frequency band of the overall cellular telephone frequency band.

The IF signal is then passed through a surface acoustic wave (SAW) bandpass filter which in the preferred embodiment is approximately 1.25 MHz in bandwidth. The characteristics of the SAW filter are chosen to match the waveform of the signal transmitted by the cell-site which has been direct sequence spread spectrum modulated by a PN sequence clocked at a predetermined rate, which in the preferred embodiment is 1.25 MHz. This clock rate is chosen to be an integer multiple of a number of common data rates such as 16 Kbps, 9.6 Kbps, and 4.8 Kbps.

Receiver 34 also performs a power control function for adjusting the transmit power of the mobile unit. Receiver 34 generates an analog power control signal that is provided to transmit power control circuitry 38. The control and operation of the mobile unit power control feature is disclosed in copending U.S. patent application entitled "METHOD AND APPARATUS FOR CONTROLLING TRANSMISSION POWER IN A CDMA CELLULAR MOBILE TELEPHONE SYSTEM", Ser. No. 07/433,031, filed Nov. 7, 1989, now U.S. Pat. No. 5,056,019, by the inventors hereof an assigned to the Assignee of the present invention.

Receiver 34 is also provided with an analog to digital (A/D) converter (not shown) for converting the IF signal to a digital signal with conversion occurring at a 9.216 MHz clock rate in the preferred embodiment which is exactly eight times the PN chip rate. The digitized signal is provided to each of two or more signal processors or data receivers, one of which is a searcher receiver with the remainder being data receivers.

In FIG. 2, the digitized signal output from receiver 34 is provided to digital data receivers 40 and 42 and to searcher receiver 44. It should be understood that an inexpensive, low performance mobile unit might have only a single data receiver while higher performance units may have two or more to allow diversity reception.

The digitized IF signal may contain the signals of many on-going calls together with the pilot carriers transmitted by the current and all neighboring cell-sites. The function of the receivers 40 and 42 are to correlate the IF samples with the proper PN sequence. This correlation process provides a property that is well-known in the art as "processing gain" which enhances the signal-to-interference ratio of a signal matching the proper PN sequence while not enhancing other signals. Correlation output is then synchronously detected using the pilot carrier from the closest cell-site as a carrier phase reference. The result of this detection process is a sequence of encoded data symbols.

A property of the PN sequence as used in the present invention is that discrimination is provided against multipath signals. When the signal arrives at the mobile receiver after travelling upon more than one path there will be a difference in the reception time of each multipath propagation of the signal. This reception time difference corresponds to the difference in distance divided by the speed of light. If this time difference exceeds one microsecond, then the correlation process will discriminate against one of the paths. The receiver can choose whether to track and receive the earlier or later path. If two receivers are provided, such as receivers 40 and 42, then two independent paths can be tracked and in parallel.

Searcher receiver 44, under control of control processor 46 is for continuously scanning the time domain, around the nominal time of a received pilot signal of the cell-site, for other multi-path pilot signals from the same cell-site and for other cell-site transmitted pilot signals. Receiver 44 will measure the strength of any reception of a desired waveform at times other than the nominal time. Receiver 44 compares signal strength in the received signals. Receiver 44 provides a signal strength signal to control processor 46 indicative of the strongest signals.

Processor 46 provides control signals to digital data receivers 40 and 42 for each to process a different one of the strongest signals. On occasion another cell-site transmitted pilot signal is of greater signal strength than the current cell-site signal strength. Control processor 46 then would generate a control message for transmission to the system controller via the current cell-site requesting a transfer of the call, to the cell-site corresponding to the stronger pilot signal. Receivers 40 and 42 may therefore handle calls through two different cell-sites.

The outputs of receivers 40 and 42 are provided to diversity combiner and decoder circuitry 48. The diversity combiner circuitry contained within circuitry 48 simply adjusts the timing of the two streams of received signals into alignment and adds them together. This addition process may be proceeded by multiplying the two streams by a number corresponding to the relative signal strengths of the two streams. This operation can be considered a maximal ratio diversity combiner. The resulting combined signal stream is then decoded using a forward stream error detection decoder also contained within circuitry 48.

In the exemplary embodiment convolutional encoding is utilized. The convolutional encoding has a constraint length 9 and a code rate $\frac{1}{3}$, i.e. three encoded symbols are produced and transmitted for every information bit to be transmitted. The optimum decoder for this type of code is of the soft decision Viterbi algorithm decoder design. The resulting decoded information bits are passed to the user digital baseband circuitry 50.

Baseband circuitry 50 typically includes a digital vocoder (not shown). Baseband circuitry 50 further serves as an interface with a handset or any other type of peripheral device. Baseband circuitry 50 accommodates a variety of different vocoder designs. Baseband circuitry 50 provides output information signals to the user in accordance with the information provided thereto from circuitry 48.

User analog voice signals typically provided through a handset are provided as an input to baseband circuitry 50. Baseband circuitry 50 includes an analog to digital (A/D) converter (not shown) which converts the analog signal to digital form. The digital signal is provided to the digital vocoder where it is encoded. The vocoder output is provided to a forward error correction encoding circuit (not shown) for error correction. This voice digitized encoded signal is output from baseband circuitry 50 to transmit modulator 52.

Transmit modulator 52 modulates the encoded signal on a PN carrier signal whose PN sequence is chosen according to the assigned address function for the call. The PN sequence is determined by control processor 46 from call setup information that is transmitted by the cell-site and decoded receivers 40 and 42. In the alternative, control processor 46 may determine the PN sequence through pre-arrangement with the cell-site. Control processor 46 provides the PN sequence information to transmit modulator 52 and to receivers 40 and 42 for call decoding.

The output of transmit modulator 52 is provided to transmit power control circuitry 38. Signal transmission power is controlled by the analog power control signal provided from receiver 34. Furthermore, control bits are transmitted by the cell-sites in the form power adjustment commands which are processed by data receivers 40 and 42. The power adjustment command is used by control processor 46 in setting the power level in mobile unit transmission. In response to power control commands control processor 46 generates a digital power control signal that is provided to circuitry 38. Further information on the interrelationship of the receivers 40 and 42, control processor 46 and transmit power control 38 are also further described in the above-mentioned copending patent application.

Transmit power control circuitry 38 outputs the power controlled modulated signal to transmit power amplifier circuitry 36. Circuitry 36 amplifies and converts the IF signal to an RF frequency by mixing with a frequency synthesizer output signal which tunes the signal to the proper output frequency. Circuitry 36 includes an amplifier which amplifies the power to a final output level. The intended transmission signal is output from circuitry 36 to diplexer 32. Diplexer 32 couples the signal to antenna 30 for transmission to the cell-sites.

Control processor 46 is also capable of generating control messages such as cell-diversity mode requests and cell-site communication termination commands. These commands are provided to transmit modulator 52 for transmission. Control processor 46 is responsive to the data received from data receivers 40, 42 and search receiver 44 for making decisions relative to handoff and diversity combining.

Figure 3:
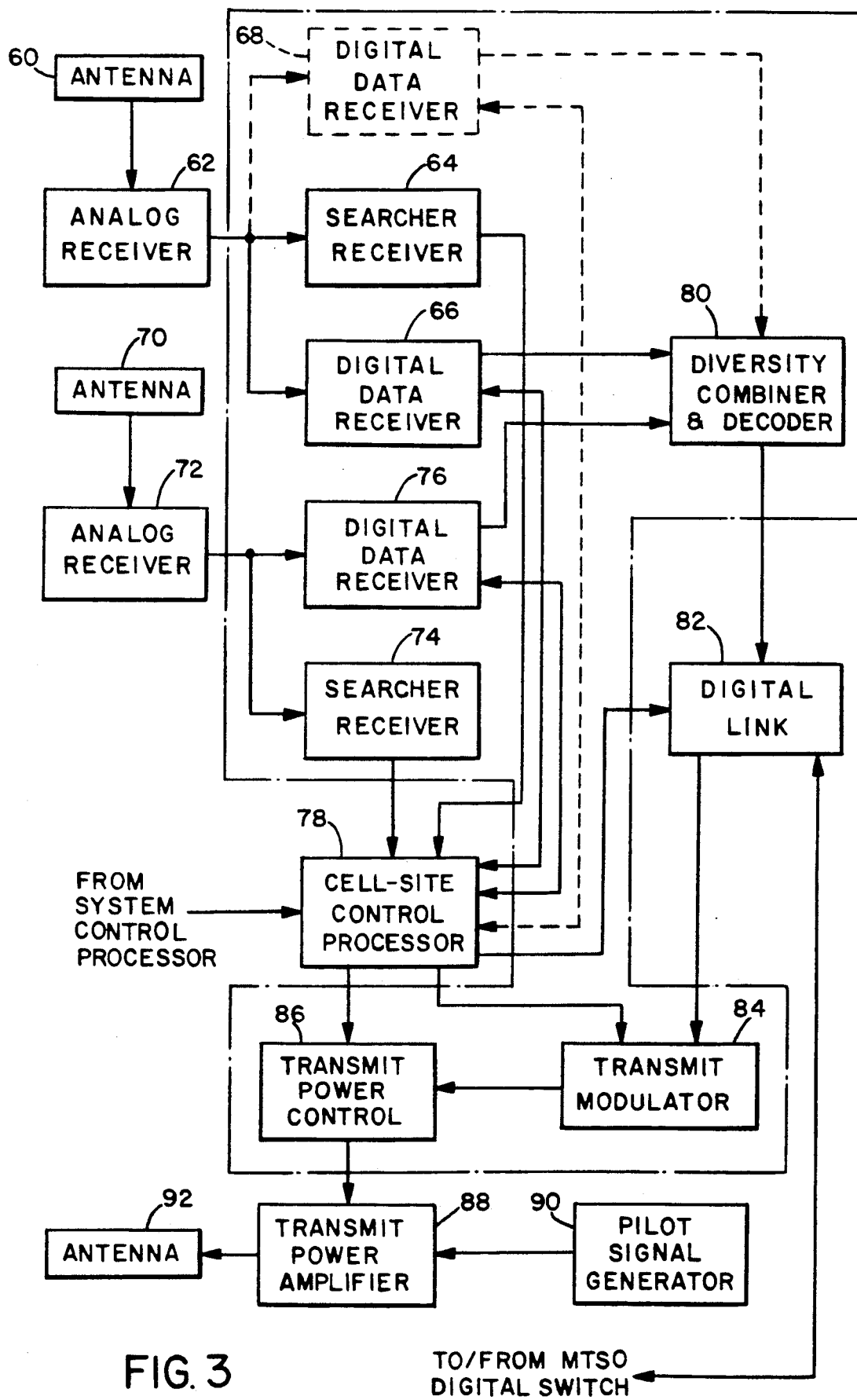
FIG. 3 is a block diagram of a cell-site equipment in a CDMA cellular telephone system.

FIG. 3 illustrates in block diagram form an exemplary embodiment of the cell-site equipment. At the cell-site, two receiver systems are utilized with each having a separate antenna and analog receiver for space diversity reception. In each of the receiver systems the signals are processed identically until the signals undergo a diversity combination process. The elements within the dashed lines correspond to elements corresponding to the communications between the cell-site and one mobile unit. The output of the analog receivers are also provided to other elements used in communications with other mobile units.

In FIG. 3, the first receiver system is comprised of antenna 60, analog receiver 62, searcher receiver 64 and digital data receiver 66. This receiver system may also include an optional digital data receiver 68. The second receiver system includes antenna 70, analog receiver 72, searcher receiver 64 and digital data receiver 66. Also utilized in signal processing and control for handoff and diversity is cell-site control processor 78. Both receiver systems are coupled to diversity combiner and decoder circuitry 80. Digital link 82 is utilized to communicate signals to and from the MTSO (FIG. 4) with cell-site transmit modulator 84 and circuitry 80 under the control of control processor 78.

Signals received on antenna 60 are provided to analog receiver 62. Received signals amplified by an amplifier in receiver 62 and translated to an IF frequency by mixing with a frequency synthesizer output signal. The IF signals are bandpass filtered and digitized in a process identical to that described with reference to the mobile unit analog receiver. The digitized IF signals are provided to digital data receiver 66, optional data receiver 68 and searcher receiver 64 and are processed respectively in a manner similar to that as disclosed with reference to the digital data receivers and searcher receiver of the mobile unit in FIG. 2. However, the processing by the digital data receivers and searcher receivers are different for the mobile to cell-site link from that used in the cell-site to mobile link in several respects.

In the inbound link, or mobile unit to cell-site link, the mobile unit does not transmit a pilot signal that can be used for coherent reference purposes in signal processing at the cell-site. Thus, the mobile unit to cell-site link utilizes a non-coherent modulation and demodulation scheme using 64-ary orthogonal signalling.

Searcher receiver 64 is again used to scan the time domain about the receiver signal to ensure that the associated digital data receiver 66, and data receiver 68 if used, are tracking and processing the strongest available time domain signal. This tracking process is identical to that described with reference to the mobile unit. Searcher receiver 64 provides a signal to cell-site control processor 78 which provides control signals to digital data receivers 66 and 68 for selecting the appropriate received signal for processing.

In the 64-ary orthogonal signalling process, each mobile unit transmitted symbol has one of 64 different possibilities. A 6 bit symbol is encoded into one of $2^6$, i.e. 64, different binary sequences. The set of sequences chosen are known as Walsh functions. The optimum receive function for the Walsh function is the Fast Hadamard Transform (FHT). In searcher receiver 64 and digital data receivers 66 and 68, the input signal is correlated as discussed with reference to the mobile unit receivers, with the correlator output fed to a FHT processor. The FHT processor produces a set of 64 coefficients for every 6 symbols. The 64 symbols are then multiplied by a weighting function generated in the receiver. The weighting function is linked to the signal strength as measured by searcher receiver 64. The weighted data is then provided as an output to diversity combiner and decoder circuitry 80.

The second receiver system processes the received signals in a manner similar to that discussed with respect to the first receiver system of FIG. 3. The weighted 64 symbols output from receivers 66 and 76 are provided to diversity combiner and decoder circuitry 80. Circuitry 80 includes an adder which adds the weighted 64 symbols from receiver 66 to the weighted 64 symbols from receiver 76. The resulting 64 coefficients are compared with one another in order to determine the largest coefficient. The magnitude of the comparison result, together with the identity or the largest of the 64 coefficients, is used to determine a set of decoder weights and symbols for use within a Viterbi algorithm decoder implemented in circuitry 80.

The Viterbi decoder is preferably of a constraint length 9, and of a code rate $\frac{1}{3}$. The Viterbi decoder is utilized to determine the most likely information bit sequence. For each vocoder data block, nominally 15 msec. of data, a signal quality estimate is obtained and transmitted as a mobile unit power adjustment command along with data to the mobile unit. Further information on the generation of this quality estimate is discussed in further detail in the co-pending application mentioned above. This quality estimate is the average signal-to-noise ratio over the 15 msec. interval.

In FIG. 3, optional digital data receiver 68 may be included for improved performance of the system. This additional data receiver alone or in combination with additional receivers can track and receive other possible delay paths of mobile unit transmitted signals. The structure and operation in this receiver is similar to that described with reference to the digital data receivers 66 and 76. Receiver 68 is utilized to obtain additional diversity modes. Optional additional digital data receivers providing additional diversity modes are extremely useful in those cell-sites which are located in dense urban areas where many possibilities for multipath signals occur.

Signals from the MTSO are coupled to the appropriate transmit modulator via digital link 82 under control of control processor 78. Transmit modulator 84 spread spectrum modulates, according to a predetermined spreading function as assigned by control processor 78, the data for transmission to the intended recipient mobile unit. The output of transmit modulator 84 is provided to transmit power control circuitry 86 where under the control of control processor 78 the transmission power may be controlled. The output of circuitry 86 is provided to transmit power amplifier circuitry 88.

Circuitry 88 includes a summer for summing the output of transmit modulator 84 with the output of other transmit modulators at the cell-site. Circuitry 88 further includes a summer for summing the pilot signal output from pilot signal generator 90 with the summed transmit modulator output signals. Circuitry 88 also includes a digital to analog converter, frequency upconversion circuitry and an amplifier for respectfully converting the digital signal to an analog signal, converting the IF frequency signals as output from the transmit modulators to an RF frequency and amplifying the RF signal. The output from circuitry 88 is provided to antenna 92 where it is radiated to mobile units within the cell-site service area.

Cell-site control processor 78 has the responsibility for assignment of digital data receivers and modulators to a particular call. Control processor 78 also monitors the progress of the call, quality of the signals and initiates teardown on loss of signal. The cell-site communicates with the MTSO via link 82 where it is coupled by a standard telephone wire, optical fiber, or microwave link.

Figure 4:
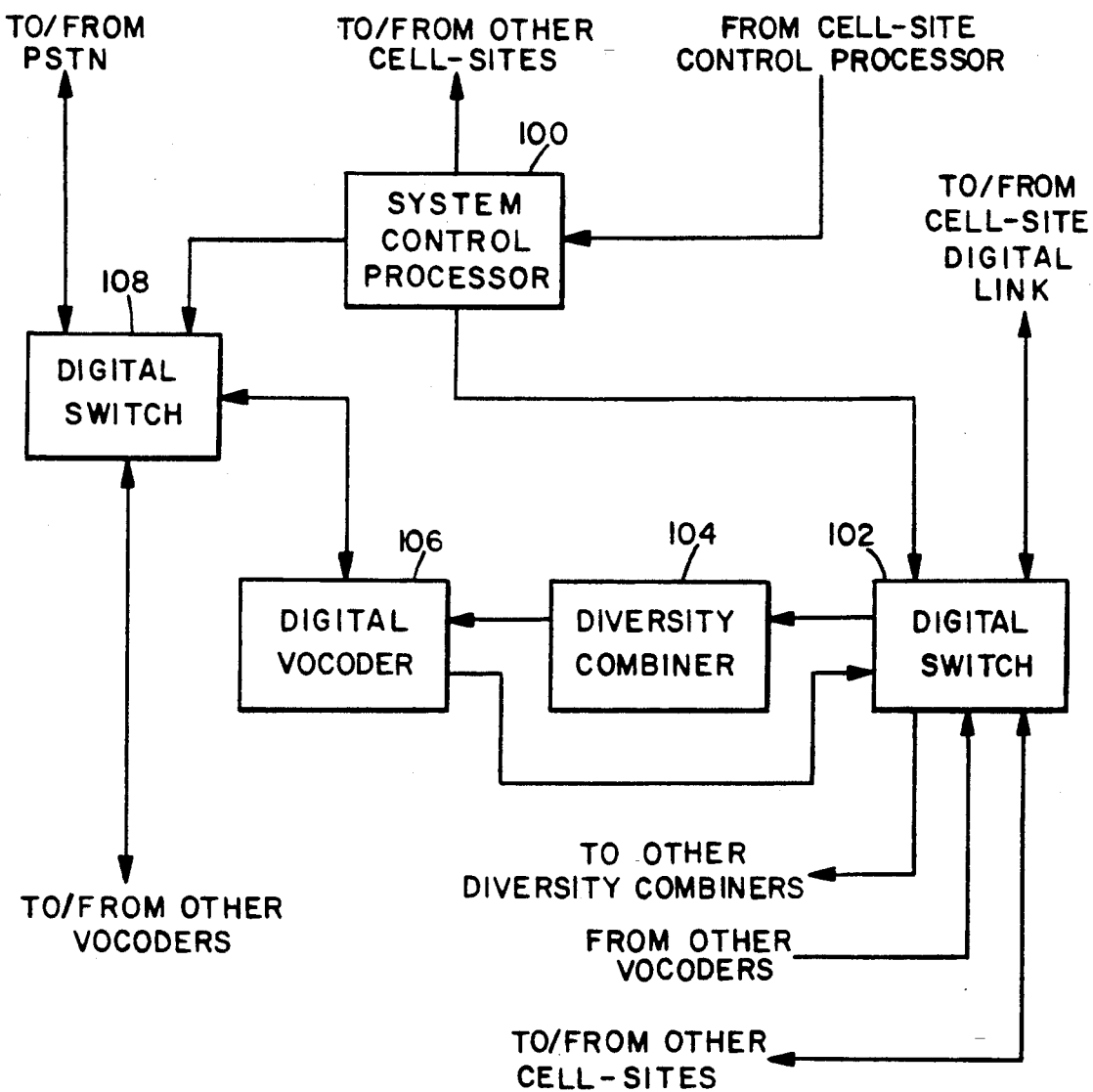
FIG. 4 is a block diagram of a mobile telephone switching office equipment.

FIG. 4 illustrates in block diagram form the equipment utilized in the MTSO. The MTSO typically includes a system controller or system control processor 100, digital switch 102, diversity combiner 104, digital vocoder 106 and digital switch 108. Although not illustrated additional diversity combiners and digital vocoders are coupled between digital switches 102 and 108.

When the cell-diversity mode is active, or the MTSO is in the handoff process with the call processed by two cell-sites, signals will arrive at the MTSO from more than one cell-site with nominally the same information. However, because of fading and interference on the inbound link from the mobile unit to the cell-sites, the signal from one cell-site may be of better quality than the signal from the other cell-site.

Digital switch 102 is used in routing the information stream corresponding to a given mobile unit from one or more cell-sites to diversity combiner 104 or the corresponding diversity combiner as determined by a signal from system control processor 100. When the system is not in the cell-diversity mode, diversity combiner 104 may be either bypassed or fed the same information on each input port.

A multiplicity of serial coupled diversity combiners and vocoders are provided in parallel, nominally, one for each call to be processed. Diversity combiner 104 compares the signal quality indicators accompanying the information bits from the two or more cell-site signals. Diversity combiner 104 selects the bits corresponding to the highest quality cell-site signal on a frame-by-frame basis of the information for output to vocoder 106.

Vocoder 106 converts the format of the digitized voice signal to standard 64 Kbps PCM telephone format, analog, or any other standard format. The resultant signals are transmitted from vocoder 106 to digital switch 108. Under the control of system control processor 100, the call is routed to the PSTN.

Voice signals coming from the PSTN intended for the mobile unit are provided to digital switch 108 to an appropriate digital vocoder such as vocoder 106 under control of system control processor 100. Vocoder 106 encodes the input digitized voice signals and provides the resulting information bit stream directly to digital switch 102. Digital switch 102 under system control processor control directs the encoded data to the cell-site or cell-sites to which the mobile unit is communicating. If the mobile unit is in a handoff mode communicating to multiple cell-sites or in a cell diversity mode, digital switch 102 routes the calls to the appropriate cell-sites for transmission by the appropriate cell-site transmitter to the intended recipient mobile unit. However, if the mobile unit is communicating with only a single cell-site or not in a cell diversity mode, the signal is directed only to a single cell-site.

System control processor 100 provides control over digital switches 102 and 108 for routing data to and from the MTSO. System control processor 100 also determines the assignment of calls to the cell-sites and to the vocoders at the MTSO. Furthermore, system control processor 100 communicates with each cell-site control processor about the assignment of particular calls between the MTSO and cell-site, and the assignment of PN codes for the calls. It should be further understood that as illustrated in FIG. 4 digital switches 102 and 108 are illustrated as two separate switches, however, this function may be performed by a single physical switching unit.

The previous description of the preferred embodiments are provided to enable any person skilled in the art to make or use the present invention. Various modifications to these embodiments will be readily apparent to those skilled in the art, and the generic principles defined herein may be applied to other embodiments without the use of the inventive faculty. Thus, the present invention is not intended to be limited to the embodiment herein, but is to be accorded the widest scope consistent with the principles as novel features disclosed herein.

We claim:

1. In a cellular telephone system in which a mobile system user and another system user communicate user information signals therebetween via at least one of a plurality of geographically separated cell-sites each defining a respective geographic service area, a system for directing communications between said mobile system user and said another system user via said at least one of said plurality of cell-sites as said mobile system user changes cell-site service areas, comprising:

means for, while said mobile system user is in a service area of one cell-site and communicating user information signals with said another system user via said one cell-site, determining a transition of said mobile system user from said one cell-site service area to a service area of another cell-site, and for providing a handoff request identifying said another cell-site;

means responsive to said handoff request for coupling a communication of said user information signals between said mobile system user and said another system user via said another cell-site while said mobile system user and said another system user continue in communication of said user information signals via said one cell-site such that said mobile system user and said another system user concurrently communicate said user information signals through said one cell-site and said another cell-site; and means responsive to said coupling of communication of said user information signals between said mobile system user and said another system user via said another cell-site for terminating said communication of said user information signals between said mobile system user and said another system user via said one cell-site with said communication of said user information signals continuing between said mobile system user and said another system user via said another cell-site.

2. The system of claim 1 wherein each cell-site transmits a pilot signal indicative of said transmitting cell-site, said means for determining comprising:

scanning receiver means located at said mobile system user for when said mobile system user is in a transition from said one cell-site service are to said another cell-site service area, receiving said cell-site transmitted pilot signals, measuring signal strength of each received pilot signal, comparing pilot signal strength measurements, and providing a signal strength signal indicative of a received pilot signal of greatest measured signal strength and cell-site of origin; and processing means located at said mobile system user for receiving said signal strength signal and for, when said signal strength signal changes from indicating said one cell-site transmitted pilot signal is of a greater signal strength than said another cell-site transmitted pilot signal to indicating said another cell-site transmitted pilot signal is of a signal strength greater than said one cell-site transmitted pilot signal, generating said handoff request.

3. The system of claim 2 wherein said mobile system user communicates said handoff request to said one cell-site for coupling to a system controller, wherein said system controller comprises said means for coupling, and said means for coupling comprises:

system processing means for receiving said handoff request and responsive thereto for generating a first switch command; and switching means for, under control of said system processing means, coupling said communication of said user information signals between said mobile system user and said another system user via said one cell-site and responsive to said first switch command for coupling said communication of said user information signals between said mobile system user and said another system user via said another cell-site.

4. The system of claim 3 wherein said means for terminating comprises:

said processing means being further responsive to said communication of user information signals between said mobile system user and said another system user via said another cell-site for generating a handoff complete command, said mobile system user communicating said handoff complete command to said system controller via at least one of said one cell-site and said another cell-site;

said system processing means being further responsive to said handoff complete command for generating a second switch command; and said switching means being further responsive to said second switch command for decoupling communication of said user information signals between said mobile system user and said another system user via said one cell-site.

5. In a cellular radio communication system, a method for handing off communications between a mobile system user and another system user from one cell to another cell comprising the steps of:

directing by a system controller a relay of user information signals between a mobile system user and another system user through one cell-site;

determining, by said mobile system user while said mobile system user and said another system user are communicating said user information signals through said one cell-site, a transition of said mobile system user from a service area of said one cell-site to a service area of another cell-site;

generating, by said mobile user in response to said transition determination, a first control signal identifying said another cell-site;

communicating said first control signal from said mobile system user through said one cell-site to said system controller;

directing, by said system controller in response to said first control signal, a communication of said user information signals between said mobile system user and said another system user through said another cell-site concurrently with said communication of said user information signals between said mobile system user and said another system user through said one cell-site.

6. The method of claim 5 further comprising the steps of:

generating, by said mobile system user in response to said communication of said user information signals between said another system user and said mobile system user via said another cell-site, a second control signal;

communicating said second control signal from said mobile system user to said system controller via at least one of said one cell-site and said another cell-site; and terminating by said system controller a directing of said user information signals to said one cell-site.

7. The method of claim 5 wherein said user information signals communicated by said mobile system user, said one cell-site and said another cell-site are spread spectrum modulated according to predetermined spreading codes.

8. The method of claim 6 wherein said user information signals communicated by said mobile system user, said one cell-site and said another cell-site are spread spectrum modulated according to predetermined spreading codes.

9. In a cellular radio telephone system in which mobile users are capable of initiating and receiving calls to and from other mobile users and users in a public telephone system wherein said calls are relayed through at least one of a plurality of cell-sites under the control of a system controller, each of said calls comprised of user information signals which are spread spectrum modulated according to a different predetermined user information signal spreading code as communicated between said at least one cell-site and a corresponding mobile user, and wherein each cell-site transmits a pilot signal that is spread spectrum modulated according to a pilot signal spreading code common to all cell-sites and each cell-site pilot signal is of a different predetermined code phase with respect to a neighboring cell-site pilot signal, a method for directing the relay of communications between a mobile user and another user through said cell-sites as said mobile user changes service areas of said cell-sites, said method comprising the steps of:

communicating user information signals between a mobile user and another user through a first cell-site;

transmitting a pilot signal by each of said first cell-site and a second cell-site;

receiving at said mobile user said first and second cell-site transmitted pilot signals;

determining at said mobile user relative pilot signal strength of said pilot signals as received at said mobile user;

generating, at said mobile user in response to said determination of relative pilot signal strength, a handoff request when said second cell-site transmitted pilot signal is of a predetermined level with respect to said first cell-site transmitted pilot signal;

communicating said handoff request to said system controller via said first cell-site;

assigning by said system controller said second cell-site to relay said communication of user information signals between said mobile user and said another user; and communicating said user information signals between said mobile user and said another user through said second cell-site wherein said mobile user and said another user concurrently communicate through both said first and second cell-sites.

10. The method of claim 9 further comprising the steps of:

detecting at said mobile user said communication of said user information signals as relayed through said second cell-site;

generating a handoff complete command at said mobile user in response to said detection of said second cell-site relayed communication of said user information signals;

transmitting said handoff complete command to at least one of said first and second cell-sites; and terminating in response to said handoff complete command said communication of user information between said mobile user and said another system user through said first cell-site.

11. The method of claim 9 further comprising the steps of:

generating a cell-diversity mode request at said first cell-site;

relaying said cell-diversity mode request to said mobile user; and wherein said mobile user is responsive to said cell-diversity mode request for maintaining communication with said another user through said first and second cell-sites.

12. The method of claim 9 wherein the step of communicating said user information signals through said first cell-site comprises the steps of:

receiving at said system controller an another user information signal from said another user;

coupling said another user information signal from said system controller to said first cell-site;

receiving at said first cell-site from said system controller said another user information signal;

modulating at said first cell-site said another user information signal according to a predetermined another user information signal spreading code so as to provide a first spread spectrum signal;

transmitting by said first cell-site said first spread spectrum signal;

receiving at said mobile user said first spread spectrum signal;

despreading, at said mobile user according to said predetermined another user information signal spreading code, said received first spread spectrum signal so as to provide said another user information signal to said mobile user;

modulating, at said mobile user, a mobile user information signal according to a predetermined mobile user information signal spreading code so as to provide a second spread spectrum signal;

transmitting by said mobile user said second spread spectrum signal;

receiving at said first cell-site said second spectrum signal;

despreading, at said first cell-site according to said predetermined mobile user information signal spreading code, said received second spread spectrum signal so as to provide said mobile user information signal;

coupling said mobile user information signal to said system controller from said first cell-site;

receiving at said system controller said mobile user information signal from said first cell-site; and providing said mobile user information signal from said system controller to said another user.

13. The method of claim 9 wherein the step of determining relative pilot signal strength comprises the steps of:

measuring pilot signal strength of said received pilot signals at said mobile user;

comparing at said mobile user said pilot signal strength measurements; and identifying one of said pilot signals of greatest signal strength.

14. The method of claim 9 wherein the step of communicating said handoff request comprises the steps of:

transmitting said handoff request to said first cell-site; and relaying by said first cell-site said handoff request to said system controller.

15. The method of claim 9 wherein the step of assigning said second cell-site to said communication of user information signals comprises the steps of:

determining from said handoff request an identification of said second cell-site;

communicating to said second cell-site an assignment of said second cell-site in communicating said user information signals between said mobile user and said another user; and selecting at said second cell-site one of a plurality of modems at said second cell-site for communication of said user information signals between said mobile user and said another user.

16. The method of claim 12 wherein the step of communicating said user information signals through said second cell-site comprises the steps of:

coupling said another user information signal from said system controller to said second cell-site;

receiving at said second cell-site from said system controller said another user information signal;

modulating at said second cell-site said another user information signal according to said another user information signal spreading code so as to provide a third spread spectrum signal;

transmitting by said second cell-site said third spread spectrum signal;

receiving at said mobile user said third spread spectrum signal;

despreading, at said mobile user according to said another user information signal spreading code, said received third spread spectrum signal;

combining said despread first and third spread spectrum signals so as to provide said another user information signal to said mobile user;

receiving at said second cell-site said second spread spectrum signal;

despreading, at said second cell-site according to said mobile user information signal spreading code, said second cell-site received second spread spectrum signal so as to provide at said second cell-site said mobile user information signal;

coupling said mobile user information signal to said system controller from said second cell-site;

receiving at said system controller said mobile user information signals from said second cell-site;

combining said at said system controller said mobile user information signals received from each of said first and second cell-sites; and providing said combined mobile user information signals from said system controller to said another user.

17. The method of claim 10 wherein the step of terminating said communication of user information signals between said mobile user and said another system user through said first cell-site comprises the steps of:

relaying by said at least one of said first and second cell-sites said handoff complete command to said system controller;

decoupling by said system controller a communication of said user information signals between said another user and said first cell-site;

discontinuing by said first cell-site a communication of said user information signals from said another user to said mobile user;

generating a termination command at said first cell-site;

transmitting said termination command to said mobile user; and discontinuing by said mobile user a communication of said user information signals from said mobile user to said first cell-site.

18. In a mobile radio telephone system in which mobile users are capable of initiating and receiving calls comprised of information signals to and from other mobile users and users in a public telephone system wherein said calls are relayed through at least one of a plurality of cell-sites under the control of a system controller and wherein each cell-site has a corresponding service area, a system for directing the relay of communications between a mobile user and another user through said cell-sites as said mobile user changes cell-site service areas, said system comprising:

means at each cell-site of a plurality of cell-sites for generating and transmitting a pilot signal indicative of each cell-site of origin;

means at said system controller for, receiving a user information signal from a user intended for a mobile user and coupling said user information signal to a first cell-site;

means at said first cell-site for, receiving said user information signal from said system controller, spread spectrum modulating said user information signals according to a first predetermined user information signal spreading code and transmitting said spread spectrum modulated user information signal to an intended recipient mobile user;

means at said mobile user for receiving and despreading said first cell-site transmitted spread spectrum modulated user information signal according to said first spreading code so as to provide a first resultant user information signal to said mobile user;

means at said mobile user for spread spectrum modulating a mobile user information signal intended for said user according to a second spreading code and transmitting said spread spectrum modulated mobile user information signal to said first cell-site;

means at said mobile user for, receiving said pilot signals transmitted by said first cell-site and a second cell site, determining relative pilot signal strength of each received pilot signal, generating a handoff request when said second cell-site transmitted pilot signal is of a predetermined level with respect to said first cell-site transmitted pilot signal, and transmitting said handoff request to said first cell-site;

means at said first cell-site for, receiving said handoff request and said spread spectrum modulated mobile user information signal, despreading said spread spectrum modulated mobile user information signal according to said second spreading code so as to provide a first resultant mobile user information signal, and for coupling said handoff request and said first resultant mobile user information signal to said system controller;

means at said system controller for, receiving said handoff request and said first resultant mobile user information signal from said first cell-site, coupling said first resultant mobile user information signal to said user, and said means for coupling said user information signal to said first cell-site being further responsive to said handoff request for coupling said user information signal to said second cell-site;

means at said second cell-site for, receiving said user information signal from said system controller, spread spectrum modulating said user information signal intended for said mobile user according to said first spreading code and transmitting said spread spectrum modulated user information signal to said mobile user;

said means at said mobile user for receiving and despreading said first cell-site transmitted spread spectrum modulated user information signal further for receiving and despreading said second cell-site transmitted spread spectrum modulated user information signal according to said first spreading code so as to provide a second resultant user information signal, combining said first and second resultant user information signals so as to provide a combined user information signal to said mobile user, and wherein said user contemporaneously communicates with said mobile user through both said first and second cell-sites;

said means at said mobile user for spread spectrum modulating said mobile user information signal further for transmitting said spread spectrum modulated mobile user information signal to said second cell-site;

means at said second cell-site for, receiving said spread spectrum modulated mobile user information signal, despreading said spread spectrum modulated mobile user information signals according to said second spreading code so as to provide a second resultant mobile user information signal, and for coupling said second resultant mobile user information signal to said system controller; and said means at said system controller for receiving said first resultant mobile user information signal from said first cell-site further for receiving said second resultant mobile user information signal from said second cell-site, combining said first and second resultant mobile user information signals so as to provide a combined mobile user information signal, and for coupling said combined mobile user information signal to said user in place of said first resultant mobile user information signal, and wherein said mobile user contemporaneously communicates with said user through both said first and second cell-sites.

19. The system of claim 18 further comprising:

said means at said mobile user for generating said handoff request further for detecting a coupling of communications between mobile user and said user, generating a handoff complete command and transmitting said handoff complete command to at least one of said first and second cell-sites;

said means at said first and second cell-sites for receiving, despreading and coupling said first and second resultant mobile user information signals to said system controller further for receiving and coupling said handoff complete command to said system controller;

said means at said system controller for receiving and combining said first and second resultant mobile user information signals from said first and second cell-sites further for, receiving said handoff complete command from said at least one of said first and second cell-sites and responsive thereto for coupling only said second resultant mobile user information signal to said user; and said means at said system controller for coupling said user information signal to said first and second cell-sites responsive to said received handoff command for decoupling said user information signal to said first cell-site.

20. The system of claim 18 wherein each cell-site spread spectrum modulates each pilot signal according to a pilot signal spreading code common to all cell-sites and cell-site each pilot signal is of a different predetermined code phase with respect to each neighboring cell-site pilot signal.

21. In a cellular radio telephone system in which mobile users are capable of initiating and receiving calls to and from other mobile users and users in a public telephone system wherein said calls are relayed through at least one of a plurality of cell-sites under the control of a system controller, each of said calls comprised of information signals which are spread spectrum modulated according to a different predetermined information signal spreading code as communicated between a user and a corresponding mobile user via at least one cell-site, and wherein each cell-site transmits a pilot signal that is spread spectrum modulated according to a pilot signal spreading code common to all cell-sites and each cell-site pilot signal is of a different predetermined code phase with respect to a neighboring cell-site pilot signal, a method for directing the relay of communications between a mobile user and another user through said cell-sites as said mobile user changes service areas of said cell-sites, said method comprising the steps of:

communicating user information signals between a mobile user and another user through a first cell-site;

determining at said first cell-site signal strength of said user information signals as received at said first cell-site from said mobile user;

generating, at said first cell-site in response to said determination of signal strength, a handoff request when said signal strength fall below a predetermined level;

communicating said handoff request to said system controller;

assigning by said system controller each cell-site of a plurality of cell-sites neighboring said first cell-site to determine signal strength of said user information signals as received at said each respective neighboring cell-site from said mobile user;

determining at each respective neighboring cell-site signal strength of said user information signals as received at said each respective neighboring cell-site from said mobile user; and reporting to said system controller by each respective neighboring cell-site signal strength of said user information signals as received at said each respective neighboring cell-site from said mobile user;

communicating said user information signals between said mobile user and said another user through at least one of said neighboring cell-sites wherein said mobile user and said another user concurrently communicates through both said first cell-site and said at least one of said neighboring cell-sites.

22. The method of claim 21 further comprising the steps of:

detecting said communication of said user information signals through said at least one of said neighboring cell-sites; and terminating said communication of user information signals between said mobile user and said another system user through said first cell-site.

23. The method of claim 21 further comprising the steps of:

generating a cell-diversity mode request at said first cell-site;

relaying said cell-diversity mode request to said mobile user; and wherein said mobile user is responsive to said cell-diversity mode request for maintaining communication with said another user through said first cell-site and said at least one of said neighboring cell-sites.

* * * * *